Aug. 6, 1929. H. SCHNEIDER 1,723,528
ELECTRIC DRIVE FOR MACHINES BY THE AID OF FREQUENCY CONVERTERS
Filed Dec. 20, 1927
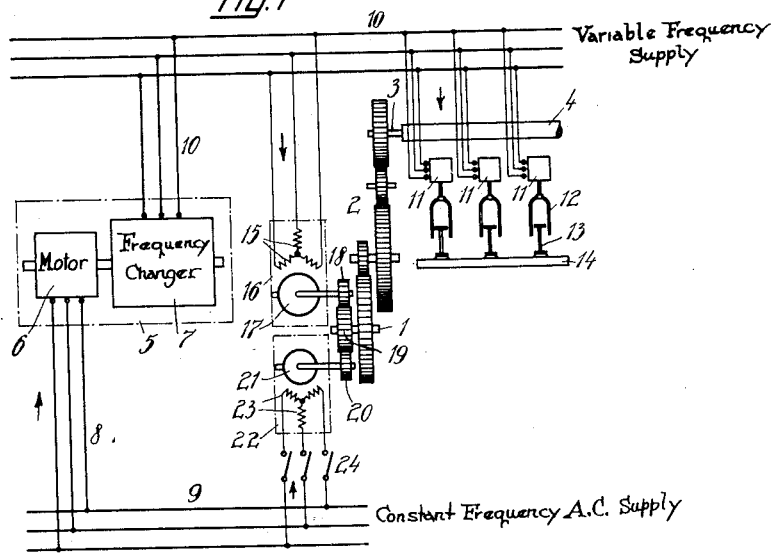
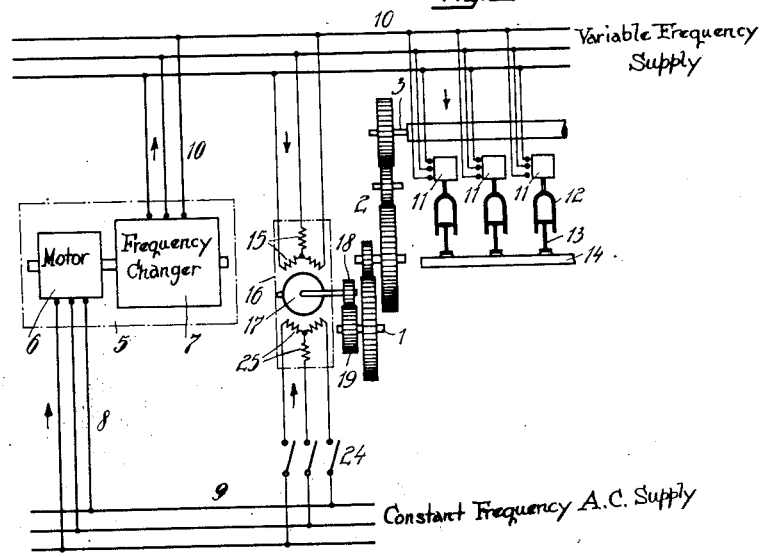

Patented Aug. 6, 1929.

1,723,528

UNITED STATES PATENT OFFICE.

HENRY SCHNEIDER, OF LENZBURG, SWITZERLAND.

ELECTRIC DRIVE FOR MACHINES BY THE AID OF FREQUENCY CONVERTERS.

Application filed December 20, 1927, Serial No. 241,341, and in Germany December 21, 1926.

My invention relates to an electric drive for machines by the aid of a frequency converter and in particular of such machines which are started in regular operation with a frequency rising from zero.

One feature of my invention is that two windings are employed for driving a machine with increasing frequency, one of which windings takes up alternating current of increasing frequency and serves for driving the machine and the other of which takes up alternating current from the alternating current network and serves for starting the machine.

A further feature of my invention is the employment of a driving and a starting winding or a driving and starting motor for the drawing frame or mechanism of a spinning machine.

Since in a spinning frame the flyers must uniformly twist the roving supplied by the delivery mechanism it is necessary that a constant ratio should exist between the speed of the shaft driving the drawing frame and the speed of the flyers. If the flyers are individually driven by electric motors, the motor driving the drawing frame as well as the motors driving the flyers are for this reason fed from the same converter with alternating current of the same frequency. When starting the spinning frame this converter begins supplying current of zero frequency and this frequency is then continuously increased. These motors must first overcome the friction in the state of rest or inertia of the parts driven by them and then accelerate these parts. The energy to be supplied by the flyer motors for this purpose is considerably less than that to be supplied by the drawing frame motor. The flyer motors thus start earlier than the drawing frame and cause the threads to break. This drawback cannot be eliminated by employing a larger-sized motor for the drawing frame, since such a motor would also require more energy, particularly for its acceleration. It would suggest itself to employ a slip-ring motor instead of a squirrel-cage motor for driving the supply of feed mechanism as the slip-ring motor develops a greater torque. Success in this direction is, however, likewise impossible, since the theoretical increase of the torque is in practice not able to develop owing to the low frequency.

According to my invention the drawback mentioned is eliminated by employing in conjunction with the drawing frame driving motor a special starting motor fed from the mains with the frequency of the supply system.

In the drawings affixed hereto and forming part of my specification two embodiments of my invention are illustrated diagrammatically by way of example.

In these drawings:

Fig. 1, represents an embodiment comprising two motors, and

Fig. 2, an embodiment comprising a single motor with two stator windings.

Referring to Fig. 1 of the drawing, 1 is the driving shaft of the motor for the drawing frame and feeder or delivery mechanism from which by means of a reduction gear 2 is driven the feeder shaft 3 with the feeder cylinder or supply drum 4. The details of the remaining parts of the draw and feed or delivery mechanism have been omitted for the sake of clearness, as they are well known.

5 is a frequency converter which consists for instance, of a motor 6 and a generator 7. This frequency converter in the form of a motor-generator set takes alternating current of constant frequency from the mains 9 through the lines 8 and supplies alternating current of variable frequency into the lines 10. The switch gear necessary for this purpose is well known and has been omitted for the sake of clearness as it does not form part of my invention. The flyer spindle motors 11 are fed from the lines 10 and drive the flyers 12. 13 are the bobbins and 14 represents the bobbin rail.

From the lines 10 are also fed the energy absorbing windings 15 of the motor 16 the armature 17 of which drives through a pinion 18 the spur wheel 19 upon the shaft 1 of the spinning machine. With the spur wheel 19 also gears the pinion 20. This pinion 20 is driven by the armature 21 of the motor 22, the energy absorbing winding 23 of which is energized from the alternating current mains 9 through the switch 24. In this case the switch 24 is shown open, since the motor 22 does not take up energy during the spinning operation itself. It is only switched on for a short time in order to facilitate the starting of the draw frame.

The starting motor 22 may be comparatively small, because it is used for short periods only and may therefore be greatly overloaded, since long intervals of rest are available for cooling it. The drawing frame motor 16 may, on the other hand, be made smaller than hitherto since it has been relieved of the work of starting the parts from rest and of the larger portion of the work required for the acceleration of the parts to be driven. This has the further advantage that the motor now supplies a normal torque for the greater part of its operation, and thus works with a more favorable power factor. It thus follows that the addition of the starting motor renders the first cost of the drive hardly more expensive and certainly improves the service considerably owing to the small phase displacement.

Referring to Fig. 2 of the drawings, it will be seen that the motor 22 has been omitted and that the motor 16 is provided with a second set of windings 25 which may be connected to the mains 9 by the switch 24. Since the additional winding set 25 is switched in during the start of the spinning machine and then for short periods only, it has very little effect upon the heating of the drawing frame motor, so that this motor need hardly be made larger and in any case very little larger only than when a special starting motor is provided. The space for the special starting motor is furthermore saved and the motor with double windings is less expensive than two separate motors.

Should in the modification Fig. 2 a magnetic coupling of the frequency converter with the network by the iron of the drawing frame motor be feared, this may easily be avoided by displacing the starting winding 25 in relation to the driving winding 15 by half a coil pitch. For this purpose the driving winding and the starting winding may also be designed for different pole-numbers.

Various modifications and changes may be made without departing from the spirit and the scope of the invention, and I desire, therefore, that only such limitations shall be placed thereon as are imposed by the prior art.

I claim as my invention:—

1. A variable speed electric drive for machines, comprising a frequency converter constituting a source of alternating current of varying frequency, and a constant frequency alternating current net work adapted to deliver energy to said converter, an electrically driven gear for said machine, a winding connected to said varying frequency converter and adapted to energize said driven gear for normal operation, and a second winding connected to said constant frequency network and adapted to also energize said driven gear to facilitate the starting of said gear.

2. A variable speed electric drive for machines, comprising a frequency converter constituting a source of alternating current of varying frequency, and a constant frequency alternating current network adapted to deliver energy to said converter, an electric motor for driving said machine having an energizing winding connected to said varying frequency source for normally driving said machine, and a second winding for said motor connected to said constant frequency net work to assist in the starting of said motor.

3. In an electric drive for spinning machines having flyers and a drawing frame, motors for driving said flyers and a motor for driving said drawing frame, a frequency converter constituting a source of varying frequency alternating current and a source of constant frequency alternating current for energizing said converter, said flyer motors being connected to said varying frequency source, said drawing frame motor having a winding also connected to said varying frequency source for energizing said motor for normal operation and a second winding removably connected to said constant frequency source and serving as a starting winding for said motor.

In testimony whereof I affix my signature.

HENRY SCHNEIDER.